United States Patent [19]
Strange et al.

[11] Patent Number: 5,142,860
[45] Date of Patent: Sep. 1, 1992

[54] CONSTANT THRUST RETENTION TURBINE TEMPERATURE LIMIT SYSTEM

[75] Inventors: Mark A. Strange, Florissant, Mo.; Walter A. Ledwith, Jr., Palm Beach Gardens, Fla.; Johnny B. Davis; Stephen N. Finger, both of Jupiter, Fla.; Gerald Bracci, Tequesta, Fla.

[73] Assignee: United Technologies Corporation, Hartford, Conn.

[21] Appl. No.: 539,940

[22] Filed: Jun. 18, 1990

[51] Int. Cl.$^5$ ............................................... F02C 9/28
[52] U.S. Cl. ................................................. 60/39.281
[58] Field of Search ...................... 60/39.281, 235, 243

[56] References Cited

U.S. PATENT DOCUMENTS

| | | | |
|---|---|---|---|
| 3,653,206 | 4/1972 | Greune | 60/243 |
| 3,854,287 | 12/1974 | Rembold | 60/243 |
| 4,159,625 | 7/1979 | Kerr | 60/243 |
| 4,313,167 | 1/1982 | Brown | 60/243 |

Primary Examiner—Louis J. Casaregola
Attorney, Agent, or Firm—Norman Friedland

[57] ABSTRACT

A control system for controlling the margin of temperature between the turbine's operating temperature and temperature limit throughout the engine operating range is manifested by utilizing a trim logic schedule that provides a constant margin value for each operating condition of the gas turbine engine. The system allows the engine to achieve the requisite performance while maintaining durability requirements.

4 Claims, 2 Drawing Sheets

CONSTANT THRUST RETENTION TURBINE TEMPERATURE LIMIT SYSTEM

DESCRIPTION

1. Technical Field

This invention relates to gas turbine engines and particularly to its control means for scheduling the limit of the temperature at the turbine.

2. Background Art

As is well known the gas turbine engine must operate within tolerable limits to avoid overheating of the engine's components. Heretofore, the engine control was designed to provide a fixed constant temperature limit value for the entire operating envelope of the engine and would achieve this end by measuring fan turbine inlet temperature and comparing this value to a fixed datum to adjust fuel flow accordingly. Obviously, the margin between the actual temperature and this fixed datum value would vary for different engine operating conditions. Since the fixed datum is a compromised value, it is selected to provide a given margin for a particular operating condition. Thus at other operating conditions the margin is at a greater value so that the turbine temperature is allowed to exceed a desirable margin for that condition and during engine excursions the temperature may increase above the margin but still be within the fixed datum. This situation adversely affects the durability of the engine's components. It is desirable to maintain a constant margin which is optimum for each engine operating condition over the entire operating envelope so as to optimize operating performance and attain satisfactory durability requirements.

We have found that we can provide a trim logic to achieve an optimum margin between the turbine's actual temperature and the temperature limit (datum) throughout the engine's operating envelope and the trim logic can be re-scheduled for augmented and non-augmented operating regimes.

STATEMENT OF THE INVENTION

An object of this invention is to provide an improved control for a gas turbine engine.

A feature of this invention is to provide for control means for attaining an optimum margin between the gas turbine's operating temperature and the temperature limit throughout the engine's operating range.

A further feature is to modify the schedule of a digital electronics control by generating a logic signal as a function of the error between a speed request signal and a corrected actual speed signal for trimming fuel flow to bias a fixed temperature limit.

A still further feature of this invention is to switch the schedule of the logic signal to accommodate augmentor and non-augmentor engine operating regimes.

The foregoing and other features and advantages of the present invention will become more apparent from the following description and accompanying drawings.

BEST MODE FOR CARRYING OUT THE INVENTION

While this invention discloses in its preferred embodiment, control means for a fan-jet type of power plant with an augmentor for powering aircraft it is to be understood that the principles of this invention may be employed with other types of turbine power plants which are utilized in other applications, such as industrial, marine and the like.

It is to be understood by those skilled in this art that the invention can be employed with gas turbine engines that are not equipped with afterburner for powering all types of aircraft.

A detailed description of the gas turbine engine is omitted herefrom for the sake of simplicity and convenience. Suffice it to say that the engine is a twin spool, fan-jet axial flow turbine power plant with an augmentor.

Figure 1:
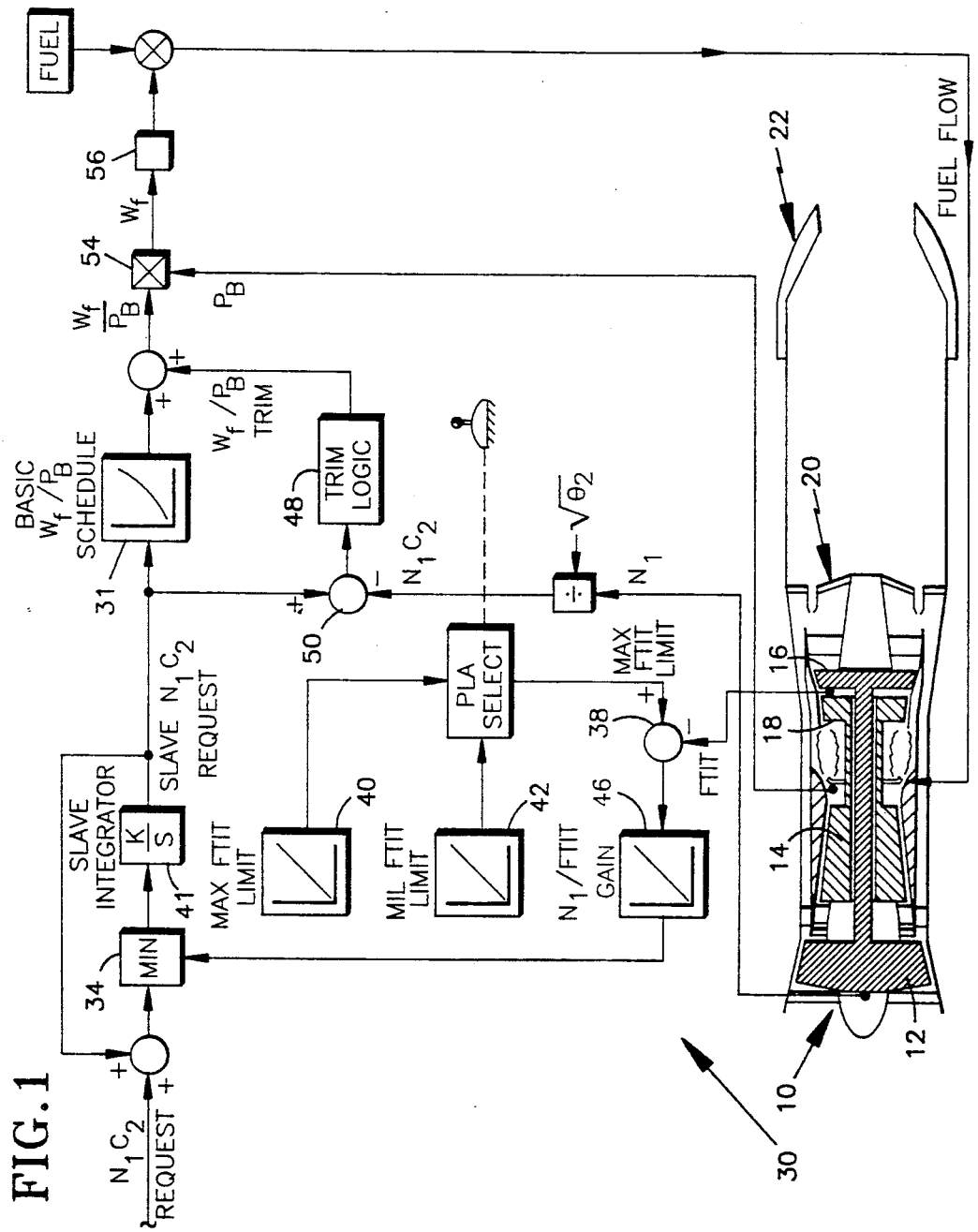
FIG. 1 is a view partly in schematic and partly in block diagram illustrating this invention.

Referring more particularly to FIG. 1 the fan-jet engine is generally illustrated by reference numeral 10 comprising the multistage fan/compressor 12, the high pressure compressor 14 driven by the low pressure turbine 16 and the high pressure turbine 18 respectively. A portion of air introduced to the fan/compressor 12 and high pressure compressor 14 is fed to the combustor which burns with fuel to power the high pressure turbine 16 and the low pressure turbine 18. A portion of the air is delivered to the augmentor 20 combusted with fuel for augmenting the thrust produced by the core engine just described. As is typical the combusted air is exhausted into atmosphere through the variable nozzles 22 which is adapted to optimize thrust for any given engine operating condition.

The next portion of this description pertains to the control that controls the operation of the engine and is only directed to that portion of the control that is necessary to describe the turbine temperature limit schedule.

Although the control is implemented by a digital electronic special purpose computer which is designed to provide many functions other than the limits to which this invention pertains, it is to be understood that the concept of this invention can apply to other mediums of control, such as analogue, hydro-mechanical, mechanical and the like.

Figure 2:
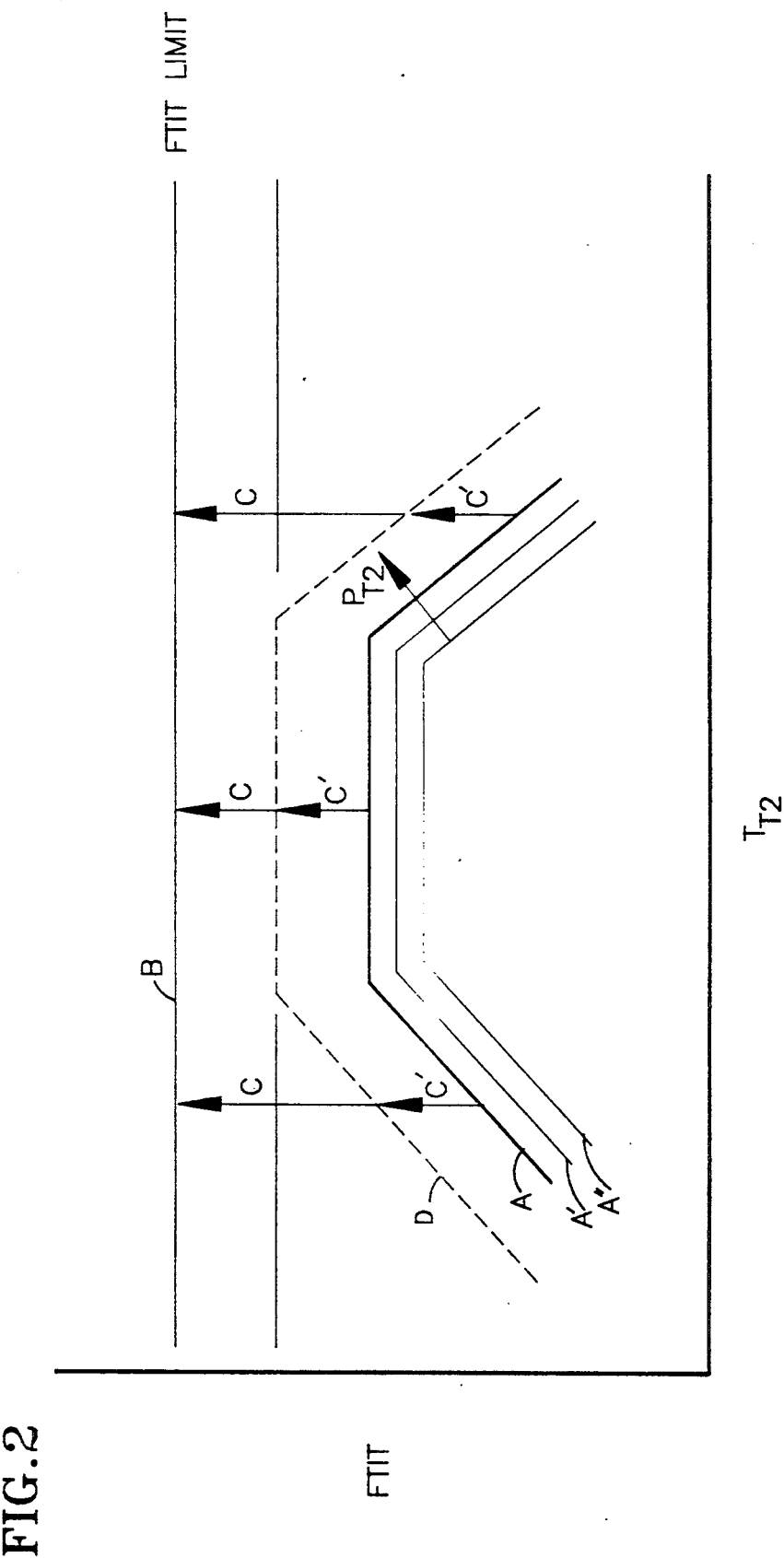
FIG. 2 is a simplified graphical illustration of the margin created by this invention where fan turbine inlet temperature (FTIT) is plotted against inlet total temperature ($T_{T2}$) and biased by engine inlet pressure ($P_{T2}$) bias to produce a family of schedules operating over the aircraft flight envelope.

To appreciate this invention it is best to refer to FIG. 2 which is a plot of FTIT vs. $T_{T2}$ showing a family of representative operating lines A, A', A" of the engine 10 for given engine inlet pressures ($P_{T2}$). The conventional control applies a temperature limit by selecting a datum line B. Obviously, the margin illustrated by the vertical lines C+C' is different along different points where the operating line A slopes.

As is apparent from the foregoing by having a fixed temperature limit datum the margin over the engine's operating range varies. The purpose of this invention is to obtain a constant margin represented by dash line D throughout the engine's operating envelope. This is accomplished by providing for constant margin limits that are a function of both $P_{T2}$ and $T_{T2}$ (see FIG. 2).

Referring again to FIG. 1, fuel flow ($W_f$) is regulated by the fuel control generally illustrated by reference numeral 30 by generating a fuel flow signal that is the multiplicand of a $W_f/P_B$ signal times a $P_B$ signal, where $P_B$ is burner pressure or compressor discharge pressure. $W_f/P_B$ signal is scheduled by function generator 31 and is a function of a slave speed request signal $N_1C_2$ which is a corrected speed signal that is a function of the integral of a requested $N_1C_2$, which is the input from another portion of the control and is a function of aircraft flight conditions. Integrator 41 serves to integrate $N_1C_2$ request signal in a downwardly direction when it is determined that FTIT is above the limit. The inputs to the minimum select 34 is the minimum value of the difference between the $N_1C_2$ slave and $N_1C_2$ speed request signal and the error between actual FTIT and the maximum FTIT limit signal produced by summer 38. This serves to override the $N_1C_2$ signal when in overtemperature. The max FTIT limit signal may be switched by power lever (PLA) from maximum engine operation (function generator 40) or military engine operation (function generator 42) when used in military engine applications. For engine stability a gain represented by box 46 may be applied to the limit signal.

The trim logic signal generator 48 that optimizes the margin between the turbine's operating temperature and turbine limit for the various engine operating conditions trims the $W_f/P_B$ scheduled signal as a function of the error produced by summer 50 which is the difference between the slave $N_1C_2$ request signal and the actual corrected $N_1$ signal, i.e. $N_1C_2$. The output of multiplier 54, which multiplies $W_f/P_3$ signal by actual $P_B$ controls actuator 56 which in turn adjusts the fuel throttle valve for delivering the requisite amount of fuel flow to engine 10.

Although this invention has been shown and described with respect to detailed embodiments thereof, it will be understood by those skilled in the art that various changes in form and detail thereof may be made without departing from the spirit and scope of the claimed invention.

We claim:

1. A control system for a gas turbine engine having a turbine, and a burner for generating fluid working medium for powering said turbine, fuel regulating means for regulating fuel flow to said burner, control means for controlling said fuel regulation means for regulating the flow of fuel to said burner in response to engine operating variables establishing the engine operating line for steadystate operation, temperature-limit means including trim logic means for trimming said control means for rescheduling fuel flow to said burner for establishing a temperature margin for each operating condition of said gas turbine engine, and said temperature limit means establishing a temperature margin which is a value between the temperature of the engine operating line and a predetermined temperature limit at a substantially constant value, whereby said gas turbine engine operates below said temperature limit during transient conditions.

2. A control system as claimed in claim 1 including a compressor for pressurizing engine inlet air to said burner, and said control means establishing a different operating line for each pressure, and said temperature limit means establishing a constant temperature margin for each of said operating lines.

3. A control system as claimed in claim 1 including means responsive to the temperatures of said turbine for establishing said temperature limit scheduled by said temperature limit means.

4. A control system as claimed in claim 3 including a power lever, a control signal indicative of the difference between a requested corrected compressor speed signal established by the position of said power lever and actual turbine temperature for controlling said temperature limit means for generating the temperature margin value for each condition of engine operation.

* * * * *

UNITED STATES PATENT AND TRADEMARK OFFICE
CERTIFICATE OF CORRECTION

PATENT NO. : 5,142,860
DATED : September 1, 1992
INVENTOR(S) : Mark A. Strange, et al It is certified that error appears in the above-identified patent and that said Letters Patent is hereby corrected as shown below:

Col. 3, line 5, "Integrator 41" should read --Integrator 34--.

Claim 2, Col. 4, line 22, "each pressure" should read --each of said pressures--.

Signed and Sealed this

Seventh Day of September, 1993

Attest:

BRUCE LEHMAN

*Attesting Officer*   *Commissioner of Patents and Trademarks*